Jan. 26, 1971     A. M. WILDER     3,557,507

FABRICATED WALL

Original Filed Sept. 5, 1967

INVENTOR.
ARTHUR M. WILDER
BY William A. Murray
ATTORNEY

United States Patent Office 3,557,507
Patented Jan. 26, 1971

3,557,507
FABRICATED WALL
Arthur M. Wilder, 3620 26th St.,
Moline, Ill. 61265
Continuation of application Ser. No. 665,376, Sept. 5, 1967. This application July 8, 1969, Ser. No. 876,151
Int. Cl. E04b 1/74; E04c 1/10, 1/30
U.S. Cl. 52—404                 7 Claims

ABSTRACT OF THE DISCLOSURE

An insulating wall structure composed of inner and outer wall panels with adjoining internally projecting flanges at opposite edges, the flanges having stamped out projections extending from the faces thereof; elongated ribs composed of elastomer material extending between the inner and outer panels at the flanges and having elongated internal grooves at opposite edges with slots therein for receiving the flanges and permitting ingress of the flanges and projections into the grooves whereby the projections may engage the walls of the grooves for preventing egress thereof; and insulating material disposed in the spacing between the panels and ribs whereby the material and ribs serve as a complete insulation between the panels.

BACKGROUND OF THE INVENTION (1) Field of the invention

This invention which is a continuation of application Ser. No. 665,376, filed Sept. 5, 1967 and now abandoned relates to a wall structure and particularly to a wall structure that is fabricated or constructed of parts that are snapped into position and held there by the interconnecting of the parts. Particularly the invention relates to a fabricated wall structure composed of inner and outer panels that are completely insulated from one another so that one side of the wall structure may have different temperature and atmospheric conditions than the other without effecting sweating on one of the sides.

(2) Description of the prior art

There have in the past been fabricated wall structures composed of inner and outer wall panels. However, such have been interconnected by metal structural elements that transmit temperature variations between the inner and outer panels to thereby create under certain conditions sweating at the joints. Such conditions are most pronounced when the wall structure is used in refrigeration or in air conditioning housings.

SUMMARY

With the above in mind it is the primary object of the present invention to provide a fabricated insulation wall used where there is a substantially large temperature differential on opposite sides of the wall. Specifically, it is the object of the invention to provide a snap-in type fabricated wall composed of inner and outer spaced apart and parallel panels with flanges that project internally of the wall and snap into grooves of a flexible elastomer beam disposed in the spacing between the panels. The flanges of adjacent panels bear against one another and have projections thereon that contact and bear against the internal wall surfaces of the grooves to thereby retain the flanges within the grooves. The center portion of the flexible beam is of the same material as the edges forming the grooves but are thicker to thereby retain rigidity of the entire structure.

DESCRIPTION OF THE PREFERRED EMBODIMENT

Figure 1:
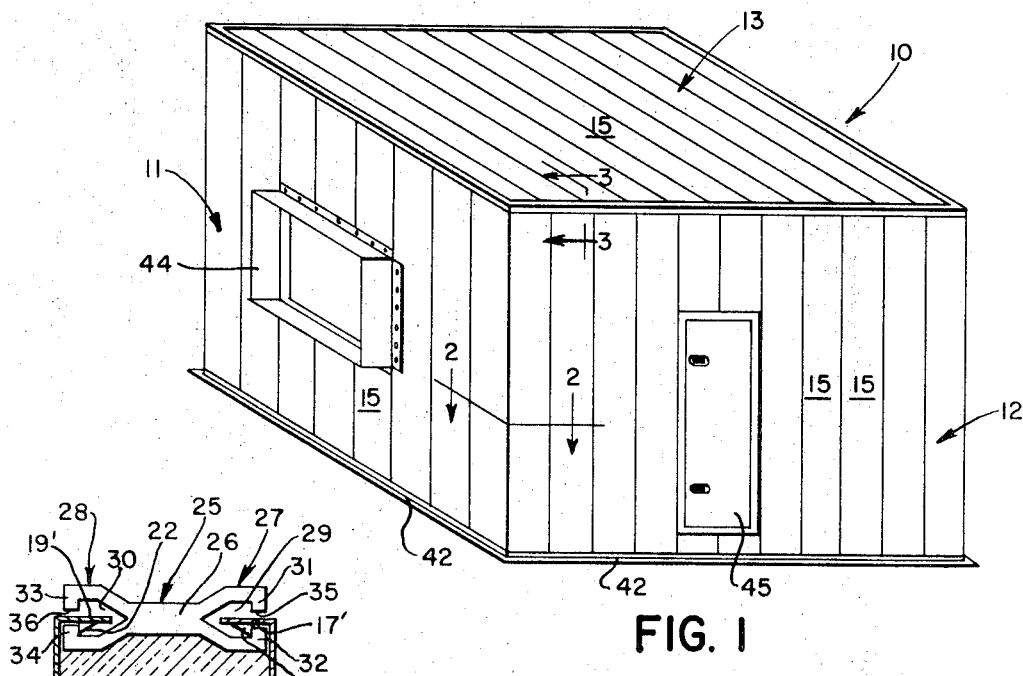
FIG. 1 is a perspective view of a housing utilizing the wall structure of the present invention.

The housing, indicated by the reference numeral 10, is one preferably used to house an air conditioner and is composed of four vertical wall structures, two of which are shown at 11, 12, an overhead wall structure 13, and a floor of some type, not shown. Often such a housing rests on the roof of a building and therefore the roof is the floor of the fabricated housing 10.

The wall structures 11-13 are composed of inner and outer parallel wall panels 14, 15 spaced apart so as to provide a spacing that may be filled with a fibre glass insulating material 16. The panels 14, 15 are identical and have inwardly projecting flanges 17, 18 and 19, 20 respectively that project internally of the respective wall structures. The flange 17 of each inner panel 14 lies alongside the flange 18 of the next adjacent inner panel 14 and the flange 19 of each outer panel 15 lies alongside flange 20 of the next adjacent outer panel 15. Each of the flanges 17-20 of the panels 14, 15 have longitudinally spaced projections 22 pressed from their surfaces and toward the internal sides of the respective panels. The projections 22 are pressed so as to taper outwardly from a narrow beginning adjacent the free edge of the respective flange to sharp edges 23 parallel to and spaced from the main portion of the respective panel.

Figure 2:
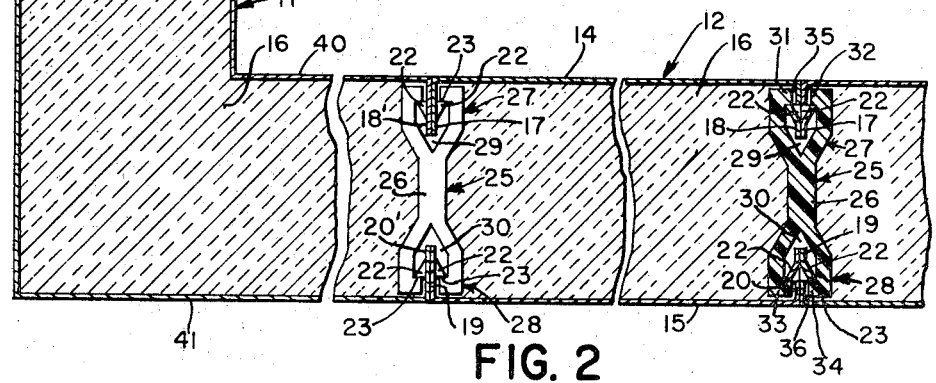
FIG. 2 is an enlarged sectional view taken substantially along the line 2—2 of FIG. 1.

Extending between and disposed in the spacing between flanges 17, 18 and 19, 20 are ribs or structural members 25 of a resilient elastomer material. In the present form of the invention the structural members 25 are composed of polyvinylchloride. However, it should be understood that any elastomer material such as rubber, plastic or others having nonheat transferring and resilient characteristics would be satisfactory. Each rib 25 includes a thick and relatively stiff central portion 26 with oppposite flared-out bifurcated or C-shaped ends 27, 28 having edge grooves 29, 30 that receive the respective flanges 17, 18 and 19, 20 respectively. The C-shaped ends 27, 28 have inwardly projecting shoulders 31, 32 and 33, 34 respectively extending from slots 35, 36 opening into the respective grooves 29, 30 to provide ingress of the flanges 17-20. As may best be seen from viewing FIG. 2, the inner surfaces of the shoulders 31, 32 are parallel to the panels 14, 15 and provide surfaces on which the edges 23 of the projections 22 may abut for purposes of retaining the respective flanges 17, 18 and 19, 20 in the grooves 29, 30.

In fabricating the wall structures an inner corner panel 40 is placed opposite an outer corner panel 41. When suitably spaced the inner corner panel 40 has an inwardly extending flange 18' directed toward an inwardly extending flange 20' on the outer corner panel 41. A rib or structural member 25 extends across and receives the flanges 18', 17 and 20', 19 in its respective grooves 29, 30 to form the first joint of the wall. Thereafter, the panels 14, 15, insulating material 16, and ribs 25 are added as needed. It should here be noted that the small ends of the projections 22 are first forced through the slots 35, 36 to separate the bifurcated ends 27, 28. Being of resilient material, the ends 27, 28 will snap shut behind the edges 23 of the projections as they move inwardly of the shoulders 31, 32 and 33, 34 respectively to thereby trap the projections behind the shoulders and within the grooves 29, 30. The flanges are thus held in side by side relation. The ribs 25 are relatively stiff, and when assembled, the entire wall structure affords a strong rigid structure.

Figure 3:
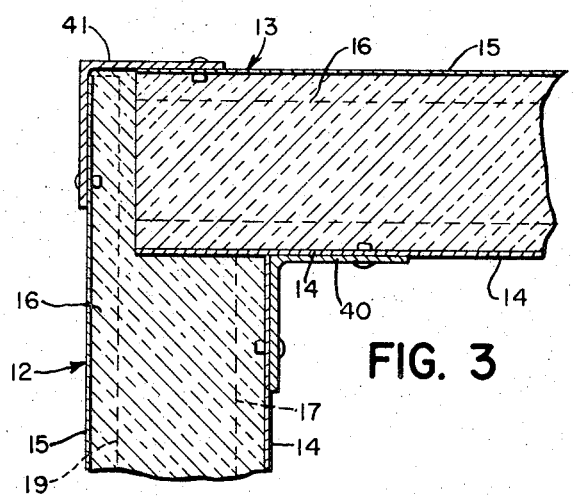
FIG. 3 is an enlarged sectional view taken along the line 3—3 of FIG. 1.
Figure 4:
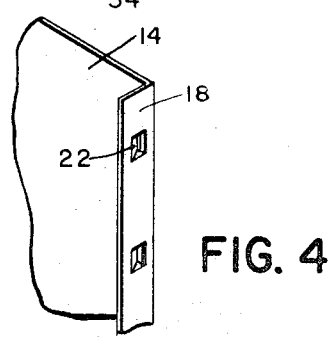
FIG. 4 is a perspective view of a portion of a panel.

Referring now to FIG. 3, the upper wall 13 is constructed identically to the side walls 11, 12 and has its ends overlying the top edges of walls 11, 12. Inner and outer angle iron members 40, 41 are riveted to the inner sides of the inner panels 14 and to the outer sides of the outer panels 15 respectively to form the joints at the upper corners of the housing. Angle iron members 42 are also fixed to the lower edges of the walls 11, 12 and may be riveted or bolted to a floor. The housing 10 is provided with a duct juncture 44 on which a heating or air conditioning duct may be connected. An access door 45 is also provided.

The present description has indicated specific materials to be used in the preferred embodiment of the invention. However, unless claimed, there is no intention to limit the invention to the specific items. For example insulating materials such as styrofoam, cork, asbestos, foamglass, gypsum and others would operate to serve substantially the same purpose as the fiberglass insulation 16. Also, while the housing may be used about an air conditioning unit, it may also be used for other purposes such as for retaining heat within it or for retaining sound insulating materials between the inner and outer panels.

I claim:

1. A wall structure composed of a plurality of spaced apart inner and outer wall panels, with each having opposite edge flanges projecting internally of the wall structure and disposed in side by side relation to and engaged with adjoining flanges of the next adjacent panels; upright structural rib elements of an extruded resilient material extending across the spacing between the inner and outer panels at the edges thereof, and having opposite end grooves with slots opening into the grooves through which the flanges of the inner and outer panels may pass, said grooves further having internal shoulders extending from opposite sides of the slots and substantially at right angles to the flanges; and lug elements on the flanges extending into the grooves, and lug elements tapering from the flanges at angles into the grooves beginning adjacent the free edges of the flanges toward the shoulders and having ends that are in opposed relation to and engaged with the shoulders whereby said slots are caused to expand by the lug elements to accommodate ingress of the flanges and close behind the lug elements following ingress to thereby move the shoulders in opposed relation to the ends and prevent egress of the flanges from the grooves.

2. The structure as set forth in claim 1 in which the portions of the rib elements forming the grooves are C-shaped with the slots being the open sides of the C-shaped grooves, and said portions are joined by a portion of the rib element that is integral with and extends between the closed sides of the C-shaped portions.

3. The structure as set forth in claim 2 in which the lug elements are integral projections bent out from the faces of the flanges to engage the internal shoulders.

4. The structure as set forth in claim 1 in which each lug element is formed by pressing a small part of the respective flange away from the flange so that the element tapers outwardly from the flange beginning adjacent the free edge of the flange and has a sharp edge defining the aforesaid end engaged with a shoulder.

5. The structure as set forth in claim 1 further characterized by the wall structure having heat insulating material in the spacings between the rib elements and the inner and outer wall panels.

6. An insulating wall structure comprising: inner and outer wall panels having perpendicular internally projecting flanges at opposite edges that are disposed in side by side engaging relation to flanges of adjacent panels, the flanges having rigid projections extending from the faces thereof, each projection tapering at an angle from its flange beginning adjacent the free edge of the flange to an end spaced from the wall portion of the respective panel; elongated ribs composed of a nonheat conductive elastomer material extending between the inner and outer panels at their edges, said ribs having grooves receiving the flanges with external slots extending lengthwise of and opening into the grooves and through which the flanges may pass to permit the projections to be disposed within the grooves, the grooves further having internal surfaces extending to opposite sides of the slots engageable with the ends of the projections, the rib portions forming the grooves being resilient to permit ingress of the tapered projections and to cause the portions to close behind the ends of the projections upon ingress into the grooves whereby the ends engage said internal surfaces of the grooves and retain the flanges within the grooves; and insulating material between the panels extending between the ribs.

7. The structure as set forth in claim 6 characterized by the flanges being flat and perpendicular to the main portions of the respective panels.

References Cited

UNITED STATES PATENTS

| 2,103,407 | 12/1937 | Dean | 52—584X |
| 2,835,360 | 5/1958 | Bernardoni et al. | 52—404X |
| 3,334,461 | 8/1967 | York | 52—317 |
| 3,242,625 | 3/1966 | Tillinghast | 52—404X |

FOREIGN PATENTS

| 487,704 | 11/1952 | Canada | 52—584 |
| 568,680 | 1945 | Great Britain | 52—584 |

FRANK L. ABBOTT, Primary Examiner

S. D. BURKE III, Assistant Examiner

U.S. Cl. X.R.

52—584